US007436091B2

(12) United States Patent
Thomas

(10) Patent No.: US 7,436,091 B2
(45) Date of Patent: Oct. 14, 2008

(54) METHOD AND SYSTEM OF LIMITING ARCING OF ROTATING MEMBER

(75) Inventor: Eric Darvin Thomas, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 274 days.

(21) Appl. No.: 11/169,482

(22) Filed: Jun. 29, 2005

(65) Prior Publication Data

US 2007/0004235 A1 Jan. 4, 2007

(51) Int. Cl.
*H02K 7/18* (2006.01)

(52) U.S. Cl. ............................ 310/71; 439/13; 439/34; 123/143 C; 310/90

(58) Field of Classification Search .................. 310/71, 310/248; 74/595; 361/216, 221, 212; 439/13, 439/23–26, 34; 123/143 C, 195 E
See application file for complete search history.

(56) References Cited

U.S. PATENT DOCUMENTS 2,256,118 A * 9/1941 Kyropoulos ................ 184/109
4,378,138 A * 3/1983 Sohre .......................... 439/26
4,515,417 A * 5/1985 Shiraishi ..................... 384/445
4,841,408 A * 6/1989 Matsunaga et al. .......... 361/220
5,454,724 A * 10/1995 Kloeppel et al. .............. 439/17
5,661,356 A * 8/1997 Fisher et al. ................ 310/219
5,804,903 A * 9/1998 Fisher et al. ................ 310/248
5,914,547 A * 6/1999 Barahia et al. ................ 310/71
5,939,812 A * 8/1999 Wetzel ........................ 310/245
6,450,847 B1 9/2002 Kashima et al.
6,530,694 B2 3/2003 Takemura
6,626,138 B2 * 9/2003 Sayama et al. .......... 123/149 R
6,729,423 B2 * 5/2004 Kobayashi et al. ......... 180/65.3
6,987,338 B1 * 1/2006 Lavasser et al. ............... 310/71
7,339,777 B2 3/2008 Barnard et al.
2001/0046338 A1 11/2001 Takemura
2002/0121821 A1 * 9/2002 Ritter .......................... 310/71
2002/0190588 A1 12/2002 Koenigs et al.
2003/0057705 A1 3/2003 Kusumi et al.
2004/0070211 A1 * 4/2004 Franchet et al. ............... 290/43
2004/0233592 A1 * 11/2004 Oh et al. ....................... 361/23
2007/0004235 A1 * 1/2007 Thomas ....................... 439/13

FOREIGN PATENT DOCUMENTS

JP 57000329 * 1/1982
JP 62-258105 * 11/1987

* cited by examiner

*Primary Examiner*—Karl I Tamai
(74) *Attorney, Agent, or Firm*—Brooks Kushman P.C.

(57) ABSTRACT

A method and system of limiting arcing of a rotating member. The method and system including provisioning an electrically conducting device to couple the electrical potential associated with the housing and rotating member so as to limiting arcing therebetween.

8 Claims, 3 Drawing Sheets

METHOD AND SYSTEM OF LIMITING ARCING OF ROTATING MEMBER

BACKGROUND OF THE INVENTION

1. Field of the Invention

The present invention relates to methods and system of limiting arcing of rotating members.

2. Background Art

In engines and other devices having rotating elements, electrical potentials can develop between the rotating element and a bearing or other housing used to facilitate the rotation thereof. For example, a bearing is commonly used with an engine crankshaft to facilitate the rotation of the crankshaft. If a sufficient difference in electrical potential develops between the bearing and the crankshaft, current may arc across a gap between the two features, which may negatively influence the crankshaft and/or bearing.

SUMMARY OF THE INVENTION

One non-limiting aspect of the present invention relates to a system of regulating an electrical potential of an element rotating within a housing so as to limit arcing. The system may include an electrically conducting device in electrical communication with the element. The device may include a rotating portion coupled to the element and a non-rotating portion coupled to the rotating portion and in electrical communication with the housing. An electrical potential of the element may be coupled with the housing by way of a current path provided through the conducting device between the element and the housing. The current coupling may be used to limit differences in electrical potential between the element and housing and thereby arcing.

In accordance with one non-limiting aspect of the present invention, the non-rotating portion may include at least one electrically conducting brush for electrically communicating with the rotating portion. Optionally, the brush may be biased against the rotating portion.

In accordance with one non-limiting aspect of the present invention, the system may further include an electric machine connected to one end of the element whereby an electrical potential imparted to the element from the electrical machine is coupled to the housing by way of the device to limit arcing.

One non-limiting aspect of the present invention relates to an engine having an engine block, a crankshaft, and at least one oil-film bearing for facilitating rotation of the crankshaft within the engine block. The engine may include an electrical coupling device in electrical communication with the crankshaft and engine block. An electrical potential of the crankshaft may be coupled with the engine block by way of a current path provided through the coupling device between the element and the housing such that the current coupling limits differences in electrical potential between the crankshaft and engine block and thereby preventing arcing.

One non-limiting aspect of the present invention relates to an engine-generator system for use with heavy-haul trucks. The engine-generator system may include a engine having an crankshaft connected at one end thereof to a generator. The generator may be configured to provide electric energy for use in driving a heavy-haul truck as a function of cranking provided by the crankshaft. The system may further include a coupling device in communication with the crankshaft for limiting a difference in electrical potential between the crankshaft and bearings used to support the crankshaft within the engine. Optionally, at least a portion of the electrical potential difference between the crankshaft and bearing is due to energy imparted to the crankshaft by the generator.

One non-limiting aspect of the present invention relates to a method of limiting arcing of an element rotating within a housing. The method may include affixing an electrically conducting member to the rotating element; affixing an electrically conducting member to the housing; and electrically coupling the electrically conducting members together to provide a current path between the rotating member and the housing, the current path coupling the electrical potential of the housing with the electrical potential of the rotating member to limit arcing therebetween. Optionally, the method may further include configuring the electrically conducting members to maintain electrical connections during lateral motion of the rotating member.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
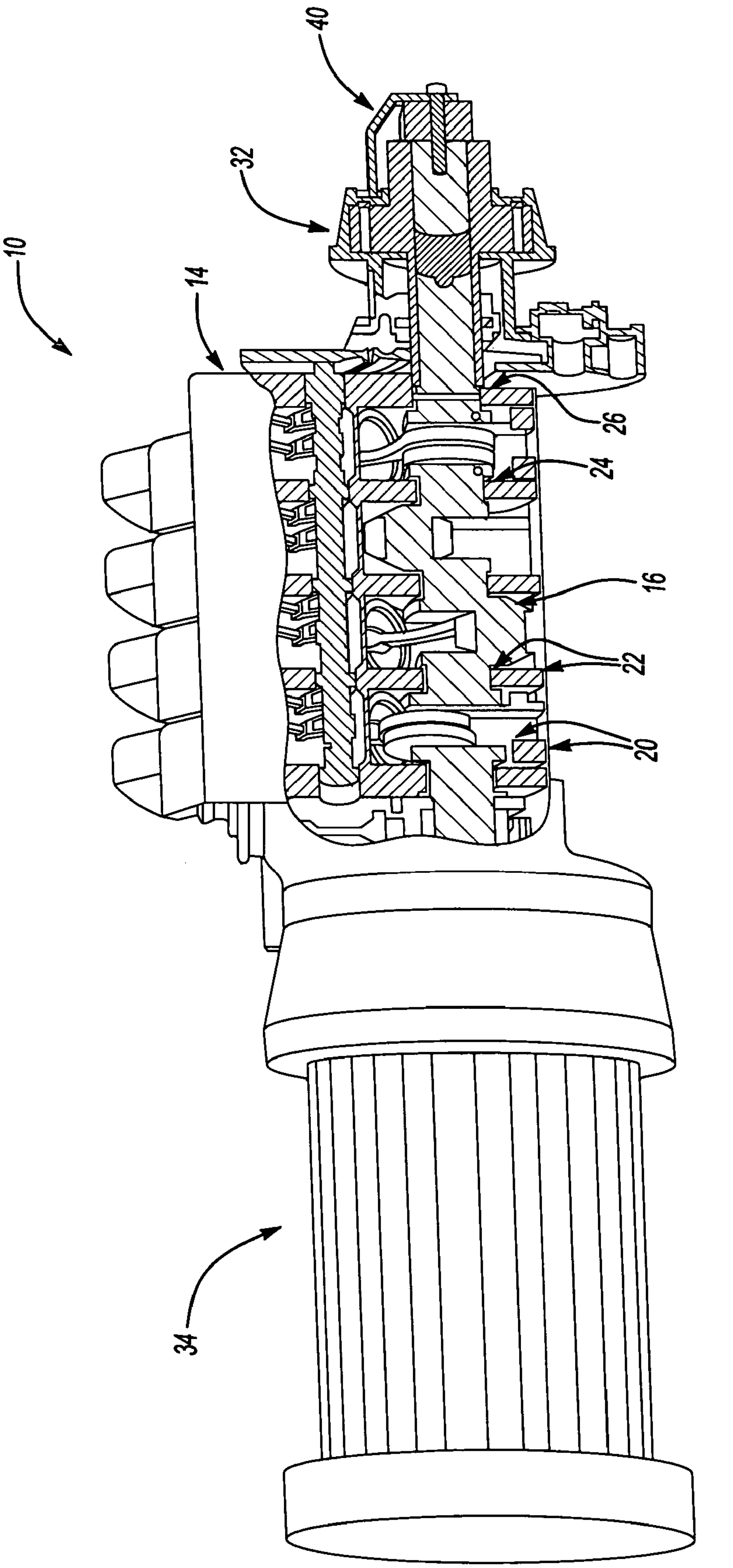
FIG. 1 illustrates a system in accordance with one non-limiting aspect of the present invention.

FIG. 1 illustrates a system 10 in accordance with one non-limiting aspect of the present invention. The system 10 may include an engine block or other housing 14, a crankshaft or other rotating element 16, and one or more bearings 20-26 to facilitate rotation of the crankshaft 16 within the engine block 14. The system 10 may be associated with a spark or compression ignition engine.

A pulley 32 and generator or other electric machine 34 may be connected to opposite ends of the crankshaft 16. The pulley 32 may be configured to drive a fan or other system features as a function of cranking provided by the crankshaft 16. The generator 34 may be configured to generate electrical power as a function of cranking provided by the crankshaft 16.

The bearings 20-26 may be roller bearings, oil film bearings, or other bearings suitable for facilitating rotation of the crankshaft 16 within the engine block 14. The bearings 20-26 may include a lubricant to facilitate rotation of the crankshaft 16, oil in the case of an oil film bearing or grease or other lubricant in the case of a roller bearing, as one having ordinary skill in the art will appreciate.

The system 10 shown in FIG. 1, and the components associated therewith, are provided for exemplary purposes and are not intended to limit the scope of the present invention. Rather, the present invention fully contemplates the system including more or less of these features.

Arcing, as one skilled in the art will appreciate, occurs when an electrical potential difference between two elements becomes such that electrons arc across a gap therebetween. With respect to metallic objects, such as the engine block 14 or bearings 20-26 and crankshaft 16, arcing may negatively influence the operation thereof. For example, arcing may cause pitting, electroplating like deposits, and other damage or wear on the features. This can negatively influence the operation and performance of the system.

The system 10 may include an electrically conducting unit 40 for electrically coupling the crankshaft 16 with the engine block 14. The coupling device 40 may comprise any suitable electrically conducting material. It may provide a current path or other electrical connection between the crankshaft 16 and the engine block 14, or other element other that the engine block 14 which is sufficient to ameliorate a difference in electrical potential between the crankshaft 16, bearings 20-26, and/or engine block 14. Ameliorating differences in electrical potential in this manner may be sufficient to minimize the likelihood of arcing, i.e., by limiting significant differences in electrical potential to levels below those associated with arcing.

Figure 2:
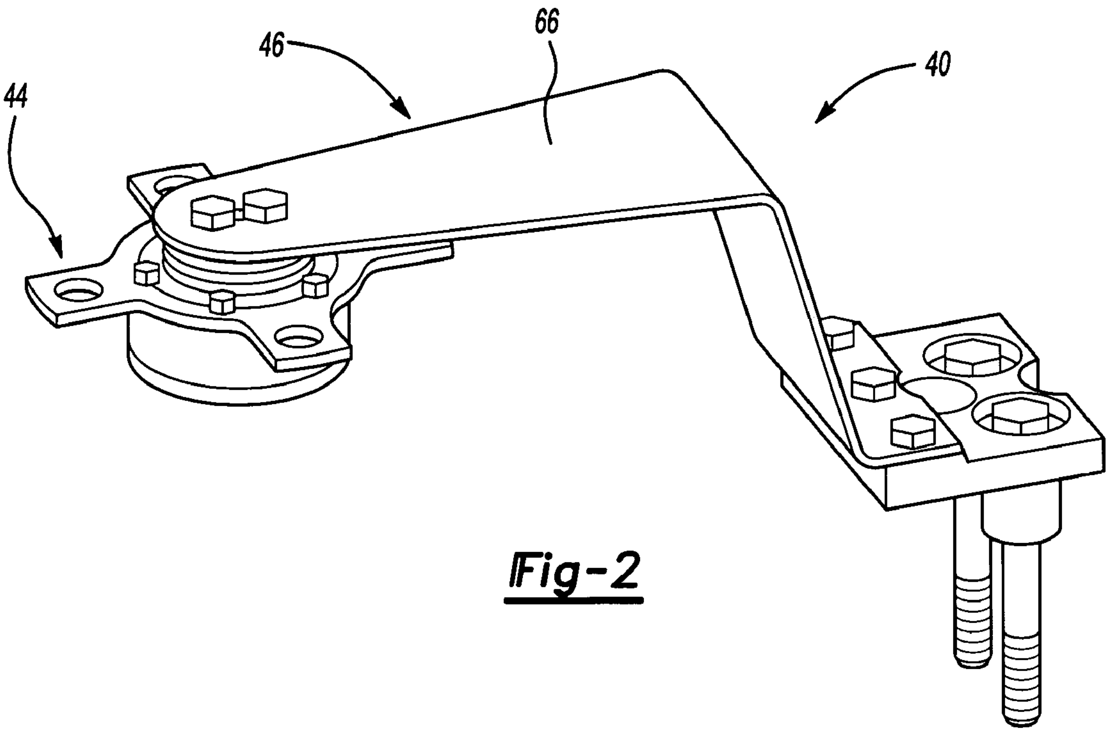
FIG. 2 illustrates a perspective view of the coupling device in accordance with one non-limiting aspect of the present invention.

FIG. 2 illustrates a perspective view of the coupling device 40 in accordance with one non-limiting aspect of the present invention. The coupling device 40 may be a rigid or substantially rigid device having a rotating portion 44 and a non-rotating portion 46.

The non-rotating portion 46 may include features for mounting to the engine block 14 and the rotating portion may include features for mounting to the crankshaft 16. The rotating and non-rotating portions may include an electrical connection therebetween to establish a current path between the engine block 14 and crankshaft 16. This connection may be used to couple or otherwise balance the electrical potential associated therewith.

Figure 3:
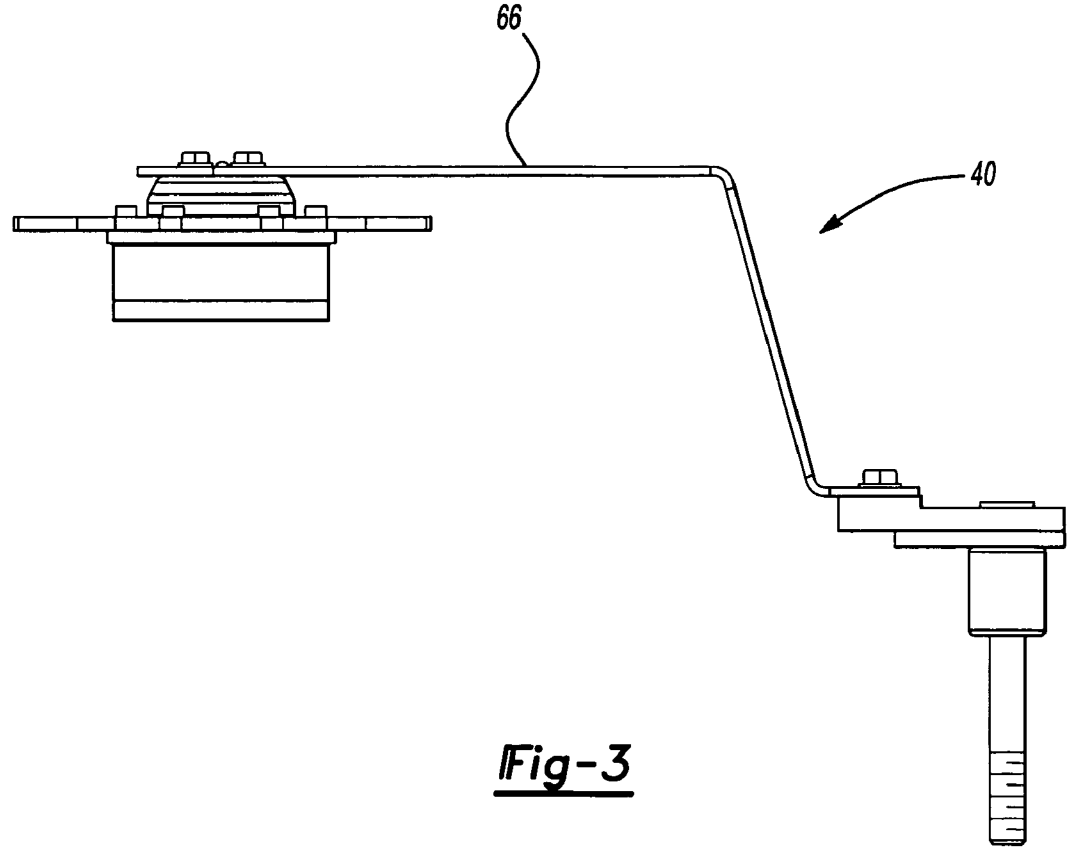
FIG. 3 illustrates a side view of the coupling device in accordance with one non-limiting aspect of the present invention.

FIG. 3 illustrates a side view of the coupling device 40 in accordance with one non-limiting aspect of the present invention. The coupling device 40 may be mounted at one end to the engine block 14 and at the other end to the pulley 32, which in turn is mounted to the crankshaft 16. Electrically conducting fasteners may be used to secure the coupling device 40 to the engine block 14 and pulley 32 and to facilitate the electrical connection thereof.

Figure 4:
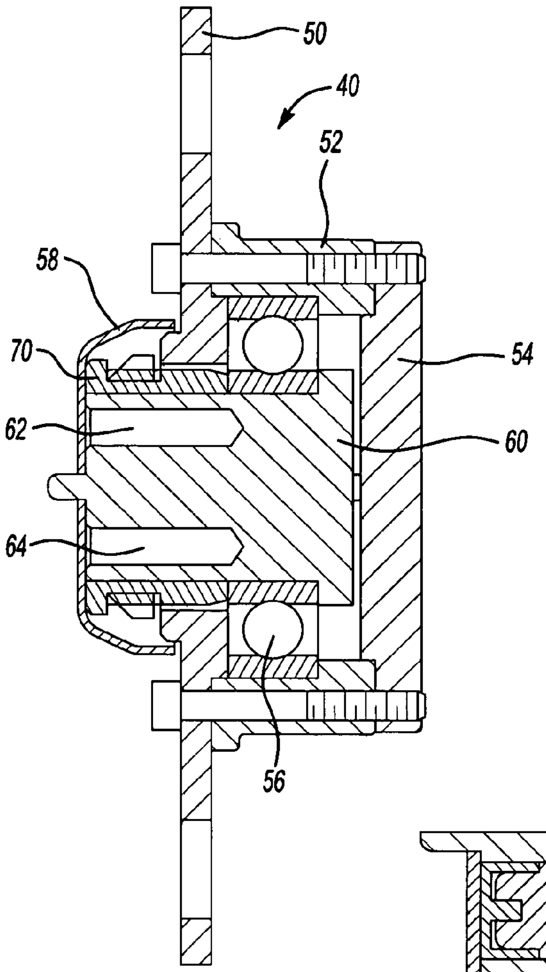
FIG. 4 illustrates a cross-sectional view of the coupling device in accordance with one non-limiting aspect of the present invention.

FIG. 4 illustrates a cross-sectional view of the coupling device 40 in accordance with one non-limiting aspect of the present invention. It may include a flange 50, a bearing housing 52, a plate 54, a roller bearing 56, and a retaining clip 58, orbiting about a shaft 60 that does not rotate with respect to the rest of the coupling device 40. The dust shield 58 and shaft 60 may include apertures 62, 64 for receiving a fastener for connecting an elongated portion 66 of the coupling device thereto (See FIGS. 2-3).

The flange 50 may include features for mounting the rotating portion to one axial end of the crankshaft 16, preferably in a location that does obstruct other functions of the engine drive system, such as nested within the optional accessory drive pulley 32 used to drive a cooling fan. The bearing housing 52 may extend outwardly from the flange 50 to define an area for receiving the shaft 60. The dust shield 58 and retaining sleeve 70 may compress or otherwise secure to the flange 50 for retaining the shaft 60 within the bearing housing 52. The clip 58 may be configured to permit rotation of the shaft 60 within the roller bearing 56.

Figure 5:
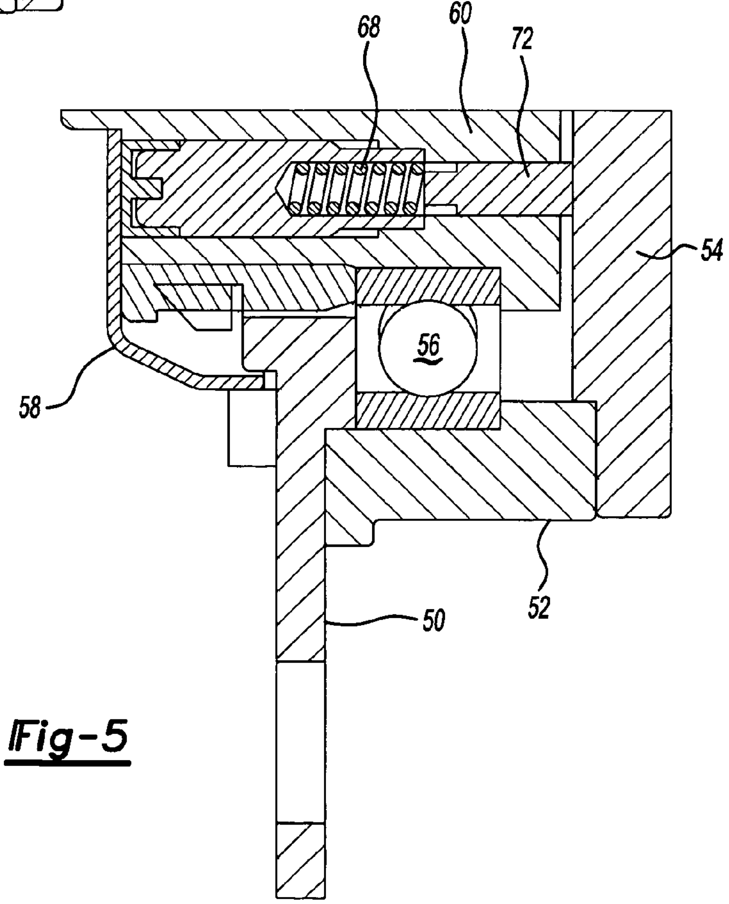
FIG. 5 illustrates a further cross-sectional view of the coupling device in accordance with one non-limiting aspect of the present invention.

FIG. 5 illustrates a further cross-sectional view of the coupling device 40 in accordance with one non-limiting aspect of the present invention. The shaft 60 may include a brush 72 to facilitate establishing an electrical connection between the shaft 60 and the plate 54, and thereby, the rotating and non-rotating portions 44, 46 of the coupling device.

The brush 72 may be a carbon-graphite brush or other brush having characteristics suitable for conducting electricity. A spring or other biasing member 68 may be included within a cavity of the shaft 60 to bias the brush against the plate 54. When contacting the plate 54, a current path is provided by the brush 72 between the rotating and non-rotating portions 44, 46.

As one skilled in the art will appreciate, the crankshaft 16 may move laterally within the engine block 14 causing a deflection of roller bearing 56. A gap may be included between the shaft 60 and plate 54 to permit such lateral movement. The brush 72, cavity, and spring 68 may be selected and dimensioned to correspond with expected lateral movement of the crankshaft 16 so that the brush 72 may remain in contact with the plate 54 during such lateral motion.

In addition to lateral motion of the crankshaft 16, radial "wobble" caused by deflections of the crankshaft 16, whether induced by the force of the piston connecting rods (not shown) or by tension forces from the fan drive belt, may be further compensated for with flexibility provided by the elongated portion 66 of the of the coupling device 40. Compensating for motion with the elongated portion 66 and limiting movement requirements of the brushes 66 may be more beneficial for maximizing longevity of the brushes 72.

One non-limiting aspect of the present invention, as generally described above, relates to limiting electrical potentials between the crankshaft 16 and engine block 14 and/or bearings 20-26, or other features within the system 10 that may lead to arcing and other problems stemming for significant differences in electrical potential. For example, electrical potentials of 0.6 volts may cause current to flow that results in surface damage to the crankshaft bearings 20-26 with thin oil film clearances between the crankshaft 16 and bearings 20-26. The coupling device 40 of the present invention may be used to limit such electrical potentials.

Induced axial, electrical bias potentials equal to or greater than 0.3 volts from tail shaft to engine flywheel connection end of generator shafts may occur as a result of imperfections in the magnetic induction components of generators. In electrical propulsion installations, such as in electric drive haul trucks, a generator tail shaft may be attached a hydraulic pump, which effectively grounds the tail shaft of the generator, completing the circuit, and thereby, endangering the crankshaft bearings. The coupling device 40 of the present invention may be used in such environments to protect from the possibility of such bearing damage in engine-to-generator connections, and thereby, eliminate the need to engineer a non-conductive engine-to-generator drive coupling system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electrical coupling device for use with an engine having a crankshaft and an engine block, the device comprising:

a rotating portion connected to the crankshaft, the rotating portion rotating with rotation of the crankshaft;

a non-rotating portion having a brush biased against the rotating portion;

a flexible member fixed to the non-rotating portion and the engine block, the flexible member establishing an electrical connection between the engine block and crankshaft; and a bearing connected between the non-rotating portion and the rotating portion.

2. The device of claim 1 wherein the bearing is positioned outside of the brush.

3. The device of claim 1 wherein the flexible member is sufficiently flexible to compensate for radial wobble of the bearing.

4. The device of claim 1 wherein the flexible member includes a first portion, second portion, and third portion, the first portion being offset from the third portion and the second portion extending between the first and third portions.

5. The device of claim 4 wherein the first portion includes an aperture for connecting to the non-rotating portion and the third portion includes an aperture for connecting to the engine block.

6. The device of claim 4 wherein the first portion is parallel to the third portion.

7. The device of claim 1 wherein the brush is biased against the rotating portion with a spring.

8. The device of claim 1 wherein the flexible member is composed of a different material than the engine block.

* * * * *